Nov. 23, 1926.
A. L. RUTHVEN
1,608,187
AIR BRAKE CONTROL
Filed May 23, 1925
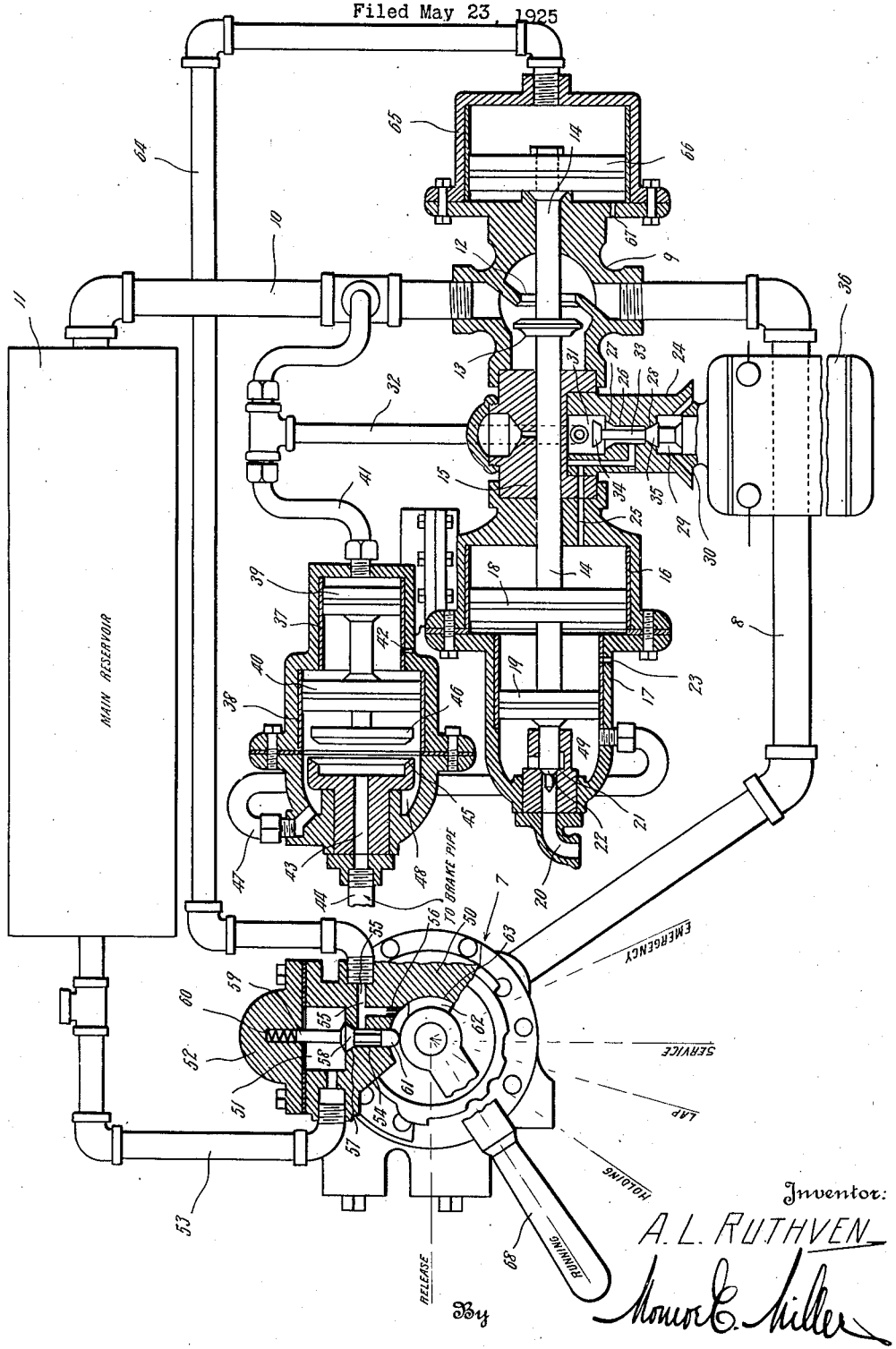
Inventor:
A. L. RUTHVEN
By Monroe E. Miller
Attorney.

Patented Nov. 23, 1926.

1,608,187

UNITED STATES PATENT OFFICE.

ALFRED L. RUTHVEN, OF ROCHESTER, NEW YORK, ASSIGNOR TO UNION SIMPLEX TRAIN CONTROL CO., INC., OF ROCHESTER, NEW YORK, A CORPORATION OF DELAWARE.

AIR-BRAKE CONTROL.

Application filed May 23, 1925. Serial No. 32,334.

The present invention relates generally to air brakes, and one object of the invention is the provision of novel means for obtaining a service application of the brakes, or a limited reduction in brake pipe or train line pressure, when there is an automatic application of the brakes, such as by the deenergization of a control electromagnet.

Another object is to provide novel means for rendering the automatic brake applying means ineffective or inoperative to apply the brakes, when the engineer's brake valve is operated for obtaining a service or emergency application of the brakes. This enables the engineer to intercept or interrupt the automatic application of the brakes by the automatic means and manually apply the brakes for either service or emergency by the usual operation of the brake valve, and the automatic means will again function if the brakes are released by the brake valve providing the electromagnet is still deenergized.

A further object is the provision of an apparatus of the kind indicated which is improved generally in the construction and arrangement of the component elements, whereby the apparatus will function efficiently.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the figure is a diagrammatical view of the apparatus, portions being shown in elevation and portions in section.

The engineer's brake valve 7 is of usual construction, and is supplied with compressed air through the pipe 8 which is coupled by a valve casing 9 with a pipe 10 connected to the main reservoir 11.

A valve is provided controlling the flow of air from the main reservoir to the brake valve 7. Thus, the casing 9 has a valve seat 12 against which a valve 13 is seatable in the direction of flow of air through the main reservoir pipes 8, 10. The valve 13 is secured on a rod 14 slidable in the casing 9 and a coupling member 15 to which the casing 9 is secured.

The valve 13 is operated pneumatically, the pneumatic means including a cylinder 16 secured to the member 15 at that end opposite to the valve casing 9, and a cylinder 17 of smaller diameter secured to the cylinder 16. Pistons 18 and 19 are secured on the rod 14 and work in the respective cylinders 16 and 17. The cylinder 17 has an exhaust port 20 opening into the atmosphere from that end of the cylinder 17 opposite to the cylinder 16 and piston 18, and a valve seat 21 is provided in the port 20 for the contact of the valve 22 formed on the corresponding end of the rod 14. The valves 13 and 22 are seated or closed alternately. Thus, the valve 13 is open when the valve 22 is closed, and the valve 22 is opened when the valve 13 is closed. The cylinder 17 has a vent aperture 23 for the inlet and outlet of air when the pistons 18 and 19 are reciprocated.

In order to control the valves 13 and 22, a member 24 is secured to the coupling member 15, and the cylinder 16 and members 15 and 24 have a passage 25 leading from that end of the cylinder 16 opposite to the cylinder 17 to a passage 26 in the member 24 between opposite valve seats 27 and 28. The member 24 has a chamber 29 with downwardly extending apertures 30 opening into the atmosphere, and said member has another chamber 31 to which is connected a branch 32 of the main reservoir pipe 10. The passage 26 communicates at its opposite ends with the chambers 29 and 31, and valves are provided for alternately connecting the passage 25 with the main reservoir and atmosphere. Thus, a stem 33 projects through the passage 26 and has valves 34 and 35 thereon to alternately seat against the seats 27 and 28, respectively, and the stem 33 is controlled by an electromagnet 36 or other suitable control means. The electromagnet is preferable, being connected to the lower end of the member 24, and when the magnet is energized the stem 33 is raised to seat the valve 35 and unseat the valve 34. Air from the main reservoir 11 flows through the pipe 10, branch 32, chamber 31, and passages 26 and 25 into the cylinder 16, to move the piston 18 toward the left, thereby opening the valve 13 and closing the valve 22. Should the magnet 36 be deenergized the stem 33 moves downwardly, thereby seating the valve 34 and unseating the valve 35. The air from the main reservoir is therefore shut off from the cylinder 16, and said cylinder is connected to the atmosphere by way of the passages 25 and 26, chamber 29 and apertures 30. The air can therefore discharge from the cylinder 16 for the movement of the rod 14 toward the right to close the valve 13 between the main reservoir and brake valve, so as to shut off the air from the brake valve. At the same time, the exhaust valve 22 is opened for the discharge of air from the brake pipe 44 as will presently appear.

Disposed between the brake pipe 44 and the exhaust valve 22 is an automatic shut off means for stopping the discharge of air from the brake pipe 44 to the atmosphere through the discharge port 20, the valve 22 being open, when the pressure in the brake pipe 44 has been reduced to a predetermined amount, thereby obtaining a service application of the brakes without completely bleeding the brake pipe. Such shut-off means includes cylinders 37 and 38 mounted on the cylinders 16 and 17 as shown, and pistons 39 and 40 working in the respective cylinders 37 and 38. The cylinder 37 and piston 39 are of smaller diameter than the cylinder 38 and piston 40. A branch 41 of the main reservoir pipe 10 is connected to the cylinder 37 at that end thereof opposite to the cylinder 38 so that main reservoir pressure acting against the piston 39 will move the pistons 39 and 40 toward the left. The cylinder 37 has a vent aperture 42 to permit air to pass in and out when the pistons 39 and 40 are reciprocated. The cylinder head of the cylinder 38 opposite to the cylinder 37 has a port 43 to which the brake pipe 44 is connected, and said cylinder head has a valve seat 45 against which is seatable a valve 46 carried by the pistons 39 and 40. The valve 46 is seated when the pistons 39 and 40 are moved toward the left by main reservoir pressure acting against the piston 39. A pipe 47 is connected at one end to the chamber 48 between the pistons 40 and port 43, and is connected at its other end to the chamber 49 in the cylinder 17 between the piston 19 and exhaust port 20. Thus, when the valves 46 and 22 are open the air may flow from the brake pipe 44 to the atmosphere by way of the port 43, chamber 48, pipe 47, chamber 49 and port 20.

In order to render the automatic brake application means ineffective with the magnet 36 deenergized, when the handle of the brake valve 7 is moved to service or emergency position, an attachment is mounted on the brake valve 7, and includes a body or member 50 bolted or otherwise fastened on the casing or body of the brake valve. The member 50 has a chamber 51 closed by a cap 52, and a pipe 53 leading from the main reservoir is connected to the member 50 in communication with the chamber 51 to supply main reservoir pressure into said chamber. The member 50 has a passage 54 leading from the chamber 51, a passage 55 leading from the passage 54, and another passage or port 56 leading from the passage 55. The member 50 has a valve seat 57 between the chamber 51 and passage 54, against which a valve 58 is seatable from within the chamber 51 in the direction of the flow of air from the main reservoir 11 through the chamber 51. The stem 59 of the valve 58 is slidable in the cap 52, and a spring 60 is seated in the cap 52 for moving the stem 59 and valve 58 to seat said valve. The stem 59 has a terminal portion 61 bearing against the inner end of the brake valve handle 68, and said inner end of the handle has a lug or portion 62 to move along the inner curved wall 63 of the member 50 concentric with the axis of the brake valve. The port 56 opens into the atmosphere and extends to the wall 63, and the forward end of the lug 62 is cut obliquely to provide a cam to engage the portion 61 when the handle 68 is moved to service or emergency position, so as to move the stem 59 against the spring 60 and open the valve 58. The portion 61 normally projects beyond the wall 63 when the valve 58 is seated, and the lug 62 also provides a closure or valve for the port 56 when the handle 68 is moved to service or emergency position and before the valve 58 is opened.

A pipe 64 leads from the passage 55 and is connected to a cylinder 65 secured to that end of the valve casing 9 opposite to the member 15. A piston 66 working in the cylinder 65 is connected to the rod 14, and the casing 9 has a vent aperture 67 for the flow of air therethrough when the piston 66 is reciprocated.

The operation of the apparatus is as follows: Under normal conditions, with the magnet 36 energized, the valve 22 is closed. Thus, the valve 35 being seated and the valve 34 unseated will permit air to flow from the main reservoir through the pipe 10, branch 32, chamber 31 and passages 26 and 25 into the cylinder 16 to move the piston 18 toward the left so as to seat the valve 22 and open the valve 13. The piston 18 being of larger diameter than the piston 19 will enable the main reservoir pressure acting against the piston 18 to overcome any brake pipe pressure acting in the opposite direction against the piston 19. The normal brake pipe pressure acting against the piston 40 will move the pistons 39 and 40 and valve 46 toward the right, so as to open the valve 46, it being noted that the piston 40 being of larger diameter than the piston 39 will enable the brake pipe pressure to overcome the opposing main reservoir pressure against the smaller piston 39.

The magnet 36, which is controlled by any suitable electrical means controlled by traffic conditions or track or wayside control elements, will when deenergized open the brake pipe 44 to the atmosphere. Thus, the valve 34 seating and the valve 35 unseating will shut off the main reservoir pressure from the piston 18, and the air in the cylinder 16 can pass to the atmosphere through the passages 25 and 26, chamber 29 and apertures 30. The brake pipe pressure acting against the piston 19 will therefore move the rod 14 toward the right to open the valve 22 and close the valve 13. The valve 13 being closed will shut off the main reservoir pressure from the brake valve 7, so that the engineer cannot deliver air from the main reservoir into the brake pipe for the purpose of releasing the brakes. The exhaust valve 22 being opened will permit air to flow from the brake pipe 44 to the atmosphere by way of the port 30, chamber 48, pipe 47, chamber 49, and port 20. This results in a reduction in brake pipe pressure and an application of the brakes. When the brake pipe pressure has been reduced to a predetermined amount, the valve 46 will be closed between the brake pipe 44 and exhaust port 20. Thus, the decrease in brake pipe pressure will also decrease the pressure against the piston 40 opposing the main reservoir pressure against the piston 39. The main reservoir pressure acting against the smaller piston 39 will become sufficient to overcome the reduced brake pipe pressure against the larger piston 40, thereby moving the pistons 39 and 40 toward the left and seating the valve 46. This arrests the discharge of air from the brake pipe, thereby obtaining a service application of the brakes, and conserving the air, instead of permitting excessive air to bleed to the atmosphere.

When the handle 68 of the brake valve 7 is in other than service or emergency position, the port 56 is open and the valve 58 closed. The cylinder 65 is thereby connected with the atmosphere by way of the pipe 64, passage 55 and port 56, so that there will be no pressure against the piston 66 opposing the movement of the rod 14. Furthermore, with the rod 14 in normal position (valve 13 being open and valve 22 closed), the apparatus is not affected by the usual operation of the brake valve 7.

However, when an automatic application of the brakes has been or is being made, and the engineer moves the handle 68 to service or emergency position, the automatic application of the brakes is automatically arrested or set aside, to enable manual application of the brakes to be made. Thus, the lug 62 first closes the port 56 to prevent discharge of air, and the lug 62 then moves the portion 61 to open the valve 58. Air will therefore flow from the main reservoir through the pipe 53, chamber 51, passages 54 and 55 and pipe 64 into the cylinder 65, so as to move the piston 66 and rod 14 toward the left. This will open the valve 13 and close the valve 22. Consequently, the discharge of air from the brake pipe 44 through the port 20 is stopped, and the main reservoir is also connected to the brake valve. The engineer may therefore obtain either a service or an emergency application of the brakes, and the brakes may also be released as usual.

Should the magnet 36 still be deenergized after the brake valve 7 has been operated to apply the brakes and then release the brakes, an automatic application of the brakes will be obtained. Thus, when the handle 68 is moved away from service or emergency position, the valve 58 is released and closes, and the port 56 is also opened. This shuts off the main reservoir pressure from the piston 66, and the cylinder 65 is connected to atmosphere by way of the pipe 64, passage 55 and port 56. The rod 14 may therefore be moved toward the right to close the valve 13 and open the valve 22 as hereinbefore described. However, the port 56 is preferably restricted so that the air discharges slowly from the cylinder 65, thereby delaying the automatic application of the brakes for a short interval, giving the engineer sufficient time in which to charge the brake pipe 44 through the valve 7, to release the brakes, before the automatic brake applying means goes into action.

When an automatic application of the brakes has been made, as aforesaid, and the magnet 36 is reenergized, so that the rod 14 is moved toward the left by the admission of air from the main reservoir into the cylinder 16, to open the valve 13 and close the valve 22, the brake valve 7 may be operated to supply air from the pipe 8 into the brake pipe 44, so as to release the brakes. When the air pressure builds up in the pipe 44, the pressure against the valve 46 from the brake pipe will overcome the opposing pressure of the main reservoir against the piston 39, inasmuch as the valve 46 is of larger diameter than the piston 39. Therefore, when normal brake pipe pressure is restored the valve 46 is opened and the brake pipe pressure against the piston 40 will then keep said valve open until again called into action as hereinbefore described.

The pistons 18, 19, 39, 40 and 66 may be diaphragms, as well known in the art, and other changes and variations may be made within the scope of what is hereinafter claimed. It is also possible to use electrical or other means for restoring the rod 14 and valves 13 and 22 to normal position when the brake valve handle 68 is removed to service or emergency position, but the pneumatic means is preferred.

Having thus described the invention, what is claimed as new is:—

1. In an air brake apparatus, a brake valve, automatic brake application means, means for nullifying the operation of the brake application means, a source of motive power for operating said nullifying means, and means controlled by the brake valve for establishing a connection between said source of motive power and nullifying means when the brake valve is operated for applying the brakes.

2. In an air brake apparatus, a brake valve, automatic brake application means, and air operated means controlling the first-named means and having its source of air controlled by said brake valve for nullifying the brake application operation of the first-named means when the brake valve is operated for applying the brakes.

3. In an air brake apparatus, a brake valve, having a handle, automatic brake application means, an air reservoir, a cylinder, a piston working in the cylinder and connected to said means for nullifying the brake application operation thereof when air is admitted into said cylinder, and means operated by said handle for connecting said cylinder and reservoir when the handle is moved to brake application position.

4. In an air brake apparatus, a brake valve having a handle, automatic brake application means, a cylinder, a piston working in the cylinder and connected to said means for nullifying the brake application operation thereof when air is admitted into said cylinder, an air reservoir, and a device associated with said brake valve and connected to said reservoir and cylinder, said device having means controlled by said handle for connecting the reservoir and cylinder when the handle is moved to brake application position and for shutting off said connection and connecting the cylinder with the atmosphere when the handle is moved away from brake application position.

5. In an air brake apparatus, a brake valve having a handle, automatic brake application means, a cylinder, a piston working in the cylinder and connected to said means to nullify the brake application operation thereof when air is admitted into said cylinder, an air reservoir, and a device associated with said brake valve and connected to said reservoir and cylinder, said device having a valve normally closing the connection between the reservoir and cylinder and a port discharging into the atmosphere and communicating with said cylinder, and means for closing said port and opening said valve when the handle is moved to brake application position.

6. In an air brake apparatus, a brake valve, a reservoir connected to the brake valve, a brake pipe, automatic means operable to open the brake pipe to atmosphere and to close the connection between the reservoir and brake valve, and automatic means for nullifying such operation of said means when the brake valve is operated for applying the brakes.

7. In an air brake apparatus, a brake valve, a reservoir normally connected to the brake valve, a brake pipe, automatic means for opening the brake pipe to the atmosphere and closing the connection between the reservoir and brake valve, an electromagnet controlling said means to prevent such operation thereof when the electromagnet is energized and means for preventing such operation of the firstnamed means while the brake valve is in brake application position.

8. In an air brake apparatus, a brake pipe. a main reservoir pipe, means for opening the brake pipe to the atmosphere, and automatic means connected to the brake and reservoir pipes and including a valve device subjected to opposing pressures from the brake and reservoir pipes and operable under brake pipe pressure to shut off the discharge of air from the brake pipe to the atmosphere, said valve device when in open and closed positions being subjected to brake pipe pressure sufficient to open said valve device when the brake pipe pressure is above a predetermined amount.

9. In an air brake apparatus, a brake pipe, a main reservoir pipe, means for opening the brake pipe to the atmosphere, and a valve device subjected to opposing pressures from the brake pipe and reservoir pipe and operable by reservoir pipe pressure for closing the connection of the brake pipe with the atmosphere, said valve device including a valve seatable in a direction to oppose brake pipe pressure, said valve device, including said valve thereof, being subjected to brake pipe pressure in either the closed or open positions of said valve to open said valve when the brake pipe pressure is above a predetermined amount.

10. In an air brake apparatus, a brake pipe, an exhaust valve adapted to be opened by brake pipe pressure for connecting the brake pipe with the atmosphere, means normally opposing brake pipe pressure to hold the exhaust valve closed and adapted to release said exhaust valve under predetermined conditions, a reservoir pipe, and a device between the brake pipe and exhaust valve including cylinders of different diameters, connected pistons working said cylinders, a valve seat between the brake pipe and larger piston, and a valve of larger diameter than the smaller piston movable with the pistons and seatable against said seat against brake pipe pressure, the reservoir pipe being connected to the cylinder of smaller diameter so that reservoir pipe pressure acts against the piston of smaller diameter in opposition to brake pipe pressure against the piston of larger diameter, in order that the lastnamed valve will be closed by reservoir pipe pressure when the brake pipe pressure is reduced to a predetermined amount.

11. In an air brake apparatus, a main reservoir, a brake pipe, a brake valve connected between said reservoir and brake pipe, air operated means for opening the brake pipe to the atmosphere and obtaining an automatic application of the brakes, electrical means controlling said means to prevent the operation thereof under clear or safe conditions, air operated means to stop the discharge of air from the brake pipe through the firstnamed means when the brake pipe pressure has been reduced to a predetermined amount, and air operated means controlled by the brake valve to nullify the operation of the firstnamed means when the brake valve is operated to apply the brakes.

12. In an air brake apparatus, a main reservoir, a brake pipe, a brake valve connected between the reservoir and brake pipe, air operated means for opening the brake pipe to the atmosphere and obtaining an automatic application of the brakes, normally energized electrical means controlling the firstnamed means to normally prevent operation thereof under clear or safe conditions and permitting operation of the firstnamed means when the electrical means is deenergized, air operated means to stop the discharge of air from the brake pipe through the firstnamed means when the brake pipe pressure has been reduced to a predetermined amount, and air operated means controlled by the brake valve to nullify the operation of the firstnamed means when the brake valve is operated to apply the brakes and to enable the firstnamed means to operate when the brake valve is in other than braking position and said electrical means is deenergized.

13. In an air brake apparatus, a main reservoir, a brake pipe, a brake valve connected between said reservoir and brake pipe, air operated means for opening the brake pipe to the atmosphere and obtaining an automatic application of the brakes, electrical means controlling said means to prevent operation thereof under clear or safe conditions, air operated means to stop the discharge of air from the brake pipe through the firstnamed means when the brake pipe pressure has been reduced to a predetermined amount and including cylinders and pistons therein of different diameters, with the larger diametered cylinder connected to the brake pipe and the smaller diametered cylinder connected to the main reservoir, and air operated means controlled by the brake valve to nullify the operation of the firstnamed means when the brake valve is operated to apply the brakes.

14. In an air brake apparatus, a main reservoir, a brake pipe, a brake valve connected between said reservoir and brake pipe, air operated means for opening the brake pipe to the atmosphere and obtaining an automatic application of the brakes, electrical means controlling said means to prevent operation thereof under clear or safe conditions, and air operated means to stop the discharge of air from the brake pipe through the firstnamed means when the brake pipe pressure has been reduced to a predetermined amount, the lastnamed means including cylinders of different diameters, connected pistons of different diameters working in said cylinders, and a valve carried by the pistons and controlling the discharge of air from the brake pipe through the firstnamed means, the cylinder of larger diameter communicating with the brake pipe and the cylinder of smaller diameter communicating with the reservoir.

In testimony whereof I hereunto affix my signature.

ALFRED L. RUTHVEN.